United States Patent [19]

Studdiford

[11] Patent Number: 5,464,135
[45] Date of Patent: Nov. 7, 1995

[54] HIGH PERFORMANCE LOCK MOUNT AND METHOD

[75] Inventor: Robert D. Studdiford, Berkeley, Calif.

[73] Assignee: Twofish Unlimited, Berkeley, Calif.

[21] Appl. No.: 368,327

[22] Filed: Jan. 4, 1995

Related U.S. Application Data

[62] Division of Ser. No. 101,196, Aug. 3, 1993, Pat. No. 5,395,018.

[51] Int. Cl.$^6$ ........................................ B62J 11/00
[52] U.S. Cl. ........................ 224/41; 224/30 R; 224/39
[58] Field of Search ...................... 224/31, 33 A, 224/35, 36, 30 A, 39, 40, 41, 42, 30 R; 24/304, 306, 68 R, 484, DIG. 16; 248/316.2, 74.2, 231, 231.1, 231.9, 74.3, 541, 229; 403/392, 396, 400; 138/112, 113

[56] References Cited

U.S. PATENT DOCUMENTS

| | | | |
|---|---|---|---|
| 1,413,530 | 4/1922 | Harned | 224/39 |
| 4,736,921 | 4/1988 | Zane et al. | 248/316.2 |
| 5,127,562 | 7/1992 | Zane et al. | 224/39 |
| 5,133,568 | 7/1992 | Balterman | 224/30 A |
| 5,138,901 | 8/1992 | Dabandjian et al. | 224/41 |
| 5,144,546 | 9/1992 | Burdi | 224/41 |
| 5,167,353 | 12/1992 | Hughes | 224/39 |
| 5,181,774 | 1/1993 | Lane | 224/30 A |
| 5,226,341 | 7/1993 | Shores | 224/30 A |
| 5,405,113 | 4/1995 | Jaw | 224/39 |

Primary Examiner—Henry J. Recla
Assistant Examiner—Gregory M. Vidovich
Attorney, Agent, or Firm—Coudert Brothers

[57] ABSTRACT

A mount or holder apparatus and method for releasably securing a lock comprised of a U-shaped shackle and a cross-bar connected across the open end thereof to a bicycle. The holder comprises a plurality of mounting blocks, each mounting block having a first concave mounting surface of a predetermined axial length in which the lock may be cradled and an opposing second concave mounting surface of a predetermined axial length in which a portion of the bicycle may be cradled. The first and second concave mounting surfaces are positioned relative to each other so that the direction of the first axial length is transverse to the second axial length. Each mounting block includes a first strap proximate the second concave mounting surface for securing the lock in the first concave mounting surface and a second strap proximate to the first concave mounting surface for securing the bicycle in the second concave mounting surface.

2 Claims, 2 Drawing Sheets

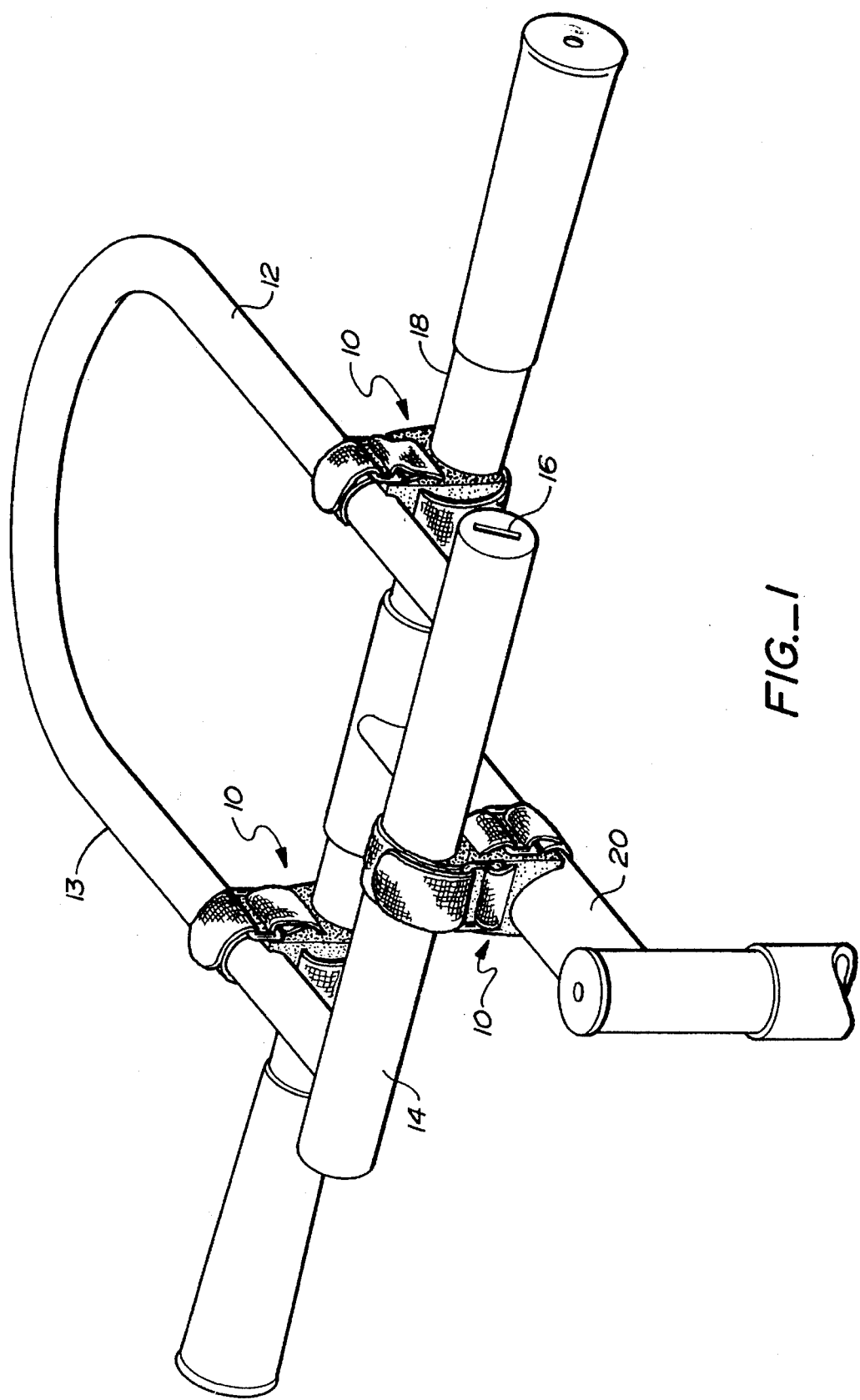
FIG._1

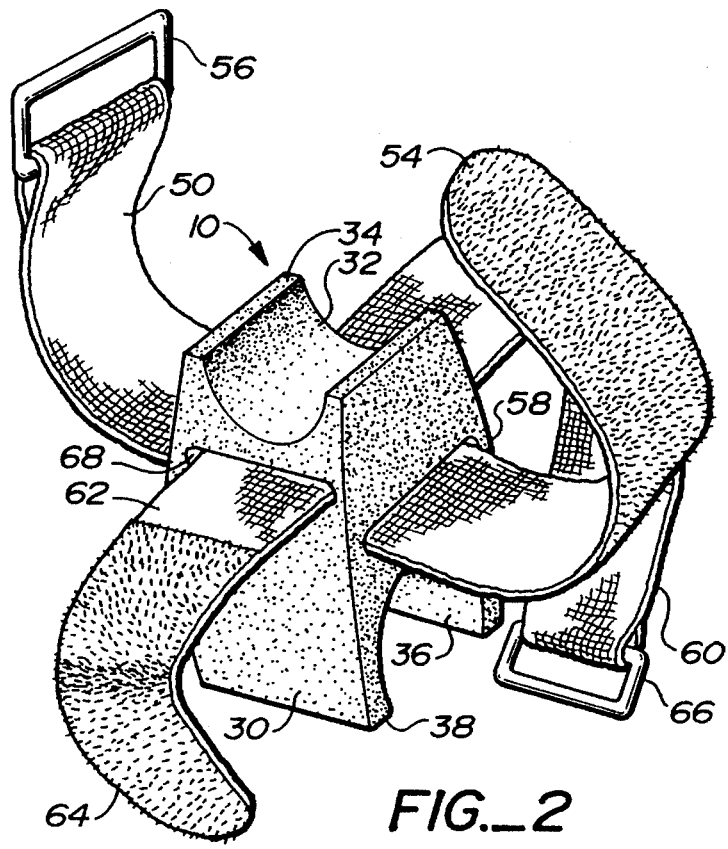
FIG._2
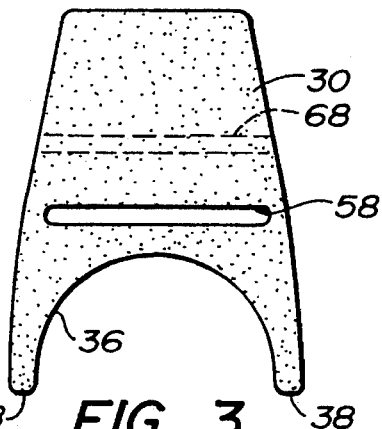
FIG._3
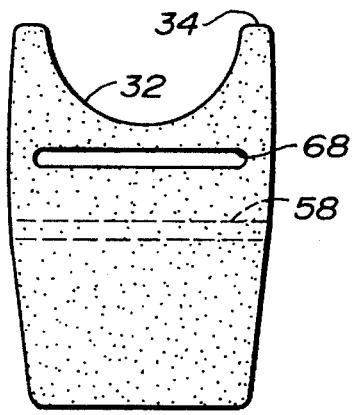
FIG._4
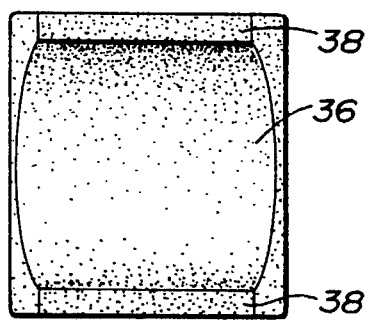
FIG._5
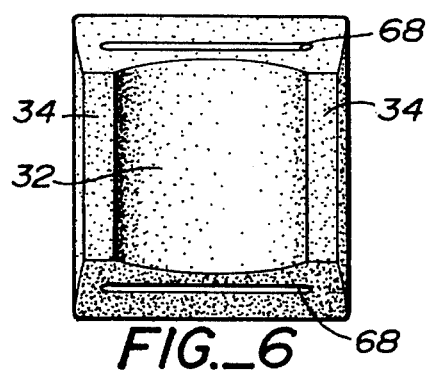
FIG._6

HIGH PERFORMANCE LOCK MOUNT AND METHOD

This is a division of application Ser. No. 08/1001,196 filed Aug. 3, 1993 which has matured into U.S. Pat. No. 5,395,018.

FIELD OF THE INVENTION

The present invention relates generally to apparatus for mounting objects to bicycles or the like. More particularly, the present invention relates to universal mounting blocks for releasably securing U-locks of the kind featuring a U-shaped shackle and a cross-bar to a bicycle.

BACKGROUND OF THE INVENTION

In recent years, U-shaped locks or U-locks have been developed to deter theft of bicycles, scooters, mopeds, motorcycles, etc. A U-lock is a lock having a U-shaped shackle and a cross-bar. The U-shaped shackle includes a pair of ends which engage the cross-bar. One of the ends of the U-shaped shackle is typically disengageable from the cross-bar when the U-lock is unlocked to permit the other end to pivot relative to the cross-bar to provide an opening to the U-shaped shackle such that the shackle may receive a portion of a bicycle frame and a stationary object such as a bike rack. Reference may be made to U.S. Pat. No. 4,736,921 to Zane, et al., U.S. Pat. No. 5,133,568 to Balterman and U.S. Pat. No. 5,127,562 to Zane, et al., for a general description of U-shaped locks and holders. One example of a U-shaped lock is the KRYPTONITE® bicycle lock of the Kryptonite Corporation of Massachusetts, the assignee of U.S. Pat. No. 5,127,562.

U-locks are generally recognized as an effective theft prevention apparatus. However, because of their extremely rigid construction, U-shape, relatively large size and heavy weight, U-shaped locks are difficult or cumbersome to carry while operating a bicycle and are likewise difficult to secure to a bicycle frame for transportation. Accordingly, many users are either unable or discouraged from carrying the lock on their person or bicycle.

In order to facilitate easy and safe U-lock transport, many prior art lock holders have been developed which attempt to secure the lock tightly to a bicycle frame. A number of prior art holders are referenced in the aforementioned Patent to Zane, et al., U.S. Pat. No. 5,127,562. However, prior art holders suffer from a number of drawbacks. For example, the U-shaped lock holder shown and described in U.S. Pat. No. 5,127,562 is designed to accommodate U-shaped locks of varying widths, lengths and thicknesses. However, the holder is comprised of a number of metallic parts which must be bolted to the bicycle frame by a metal strap. The metal strap is undesirable as it tends to mar the finish of bicycle frames. More importantly, the holder requires the use of tools for installation and removal and contains a number of sharp points and edges which pose a hazard to the bicycle operator. The '562 holder is also unsightly when compared to the design of modern bicycles.

In general prior art holders suffer from a number of disadvantages including use of dangerous and/or damaging component parts, lack of universal adaptability, unsightly characteristics, and semi-permanent mounting. Prior art holders also exhibit inadequate strength and holding characteristics.

Accordingly, it is a general object of the present invention to provide a universal means for releasably securing objects such as U-shaped locks to bicycles or the like which overcomes the shortcomings of prior art devices.

It is a further object of the present invention to provide a U-shaped lock holder of superior strength which is able to snugly secure U-shaped locks of varying lengths, widths, and thicknesses to bicycles or the like.

It is a further object of the present invention to provide a U-shaped lock holder apparatus which is able to secure U-shaped locks at alternate mounting sites.

It is a further object of the present invention to provide a U-shaped lock holder which is lightweight, attractive and safe.

It is a further object of the present invention to provide a U-shaped lock holder which is simple to install, use and remove.

It is a still further object of the present invention to provide a U-shaped lock holder which is simple and cost-effective to manufacture.

SUMMARY OF THE INVENTION

Objects and advantages of the invention will be set forth in part in the description which follows and in part will be obvious from the description and/or figures, or may be learned by practice of the invention. Such objects and advantages may be realized and attained by the means of the instrumentalities and combinations particularly pointed out in the appended claims.

The present invention overcomes the problems and disadvantages of the prior art by providing a holder for releasably securing U-shaped locks of varying lengths, widths, and thicknesses to a bicycle or the like. Moreover, the apparatus of the present invention is lightweight, attractive and safe, easy to use and remove, and is simple and cost effective to manufacture.

To achieve the objects in accordance with the purpose of the invention, as embodied and broadly described herein, there is provided a holder for releasably securing a lock comprised of a U-shaped shackle and a cross-bar connected across the open end thereof to a bicycle. The holder comprises a plurality of mounting blocks, each mounting block having a first concave mounting surface of a predetermined axial length in which the lock may be cradled and an opposing second concave mounting surface of a predetermined axial length in which a portion of the bicycle may be cradled. The first and second concave mounting surfaces are positioned relative to each other so that the direction of the first axial length is transverse to the second axial length. Each mounting block includes a first means proximate the second concave mounting surface for securing the lock in the first concave mounting surface and a second means proximate to the first concave mounting surface for securing the bicycle in the second concave mounting surface.

The accompanying drawings, which are incorporated in and constitute a part of the specification, illustrate embodiments of the invention, and together with the description, serve to explain the principles of the present invention.

BRIEF DESCRIPTION OF THE DRAWINGS

FIG. 1 is a perspective view of a U-shaped lock releasably secured to the steering control portion of a bicycle by a preferred embodiment of the holder apparatus of the present invention.

FIG. 2 is a perspective view of a preferred embodiment of a mounting block and associated lashing means according to FIG. 3 is a side elevational view of the mounting block of FIG. 2.

FIG. 4 is a side elevational view of the mounting block of FIG. 2, depicting a side of the mounting block adjacent to that shown in FIG. 3.

FIG. 5 is a bottom view of the mounting block of FIG. 2.

FIG. 6 is a top view of the mounting block of FIG. 2.

DETAILED DESCRIPTION OF THE INVENTION

Reference will now be made in detail to the preferred embodiment of the invention, examples of which is illustrated in the accompanying drawings. Throughout the description, like elements will be referred to by corresponding reference numbers.

FIG. 1 illustrates the holder apparatus of the present invention as it releasably secures U-shaped lock 13 to the control portion of a bicycle. The holder apparatus of the present invention includes a plurality of mounting blocks or holders 10 which are used in combination to releasably secure U-shaped lock 13. U-shaped lock 13 includes a U-shaped shackle 12, a cross-bar 14 and keyhole 16 and is well known to those skilled in the art. Lock 13 is shown releasably secured to the bicycle at handlebars 18 and gooseneck or stem 20. Those skilled in the art will recognize that lock 13 may advantageously be releasably secured at a variety of other locations on the bicycle, using two, three, or more mounting blocks 10 as necessary.

FIGS. 2–6 illustrate an individual mounting block 10 of the present invention. Mounting block 10 includes a body portion 30 which is advantageously constructed of a material which is soft so that it will not damage the finish of the bicycle, is sticky so that it is able to snugly secure lock 13, and is flexible and strong so as to allow block 10 to deform to accommodate a variety of shapes and sizes, yet withstand stress forces. It has been found advantageous to construct body portion 30 out of a polyelastomer having a PVC base. In the preferred embodiment, body portion 30 is constructed from KRATON® manufactured by Shell Oil Company. KRATON® grade G2705 has a tensile modulus of 400 p.s.i. at 300% elongation and a shore-A-hardness of 55. In general, materials having a shore-A-hardness of 40–85 are suitable for a wide variety of mounting applications.

Body portion 30 includes an upper concave surface 32 sized to cradle or receive the cylindrical cross-section of lock 13. Those skilled in the art will recognize that U-shaped locks such as lock 13 include a shackle portion 12 and a cross-bar 14 having a generally cylindrical cross-section. Accordingly, in the preferred embodiment of the present invention, upper concave surface 32 exhibits a generally cylindrical shape having a diameter which is sized to receive the cylindrical cross-section of shackle portion 12 and/or cross-bar portion 14 of lock 13. Those skilled in the art will recognize that the concave surface may also exhibit a V or rectangular shape so long as concave surface 32 is sized large enough to accommodate the cross-section of the member received, regardless of geometry. Upper concave surface 32 terminates at surfaces 34 which are parallel to the axis of concave surface 32.

Mounting block 10 further includes a lower concave surface 36 sized to cradle or receive the cylindrical cross-section of handlebars 18 and/or gooseneck 20. Those skilled in the art will recognize that handlebars and goosenecks, such as handlebars 18 and gooseneck 20, generally exhibit a cylindrical cross-section. Accordingly, in the preferred embodiment of the present invention, lower concave surface 36 exhibits a generally cylindrical shape having a diameter which is sized to receive the cylindrical cross-section of handlebars 18 and/or gooseneck 20. Alternate shapes of concave surface 36 are also contemplated in accordance with the discussion above. Lower concave surface 36 terminates at surfaces 38 which are parallel to the axis of concave surface 36.

The length of surfaces 34 is advantageously selected to provide adequate stability. In the preferred embodiment, the length of surfaces 34 are 15–25mm. Likewise, the length of surfaces 36 are 17–27 mm.

Suitable means for securing lock 13 to body portion 30 include slot 58 extending through body portion 30 positioned proximate surface 36. Suitable means for lashing lock 13 to surface 32 include fibrous strap 50, constructed in a manner well known to those skilled in the art, having female portion 52 (not shown), male portion 54 and buckle 56. Fibrous strap 50 is positioned within slot 58 transverse to the axis of surface 32 so that strap 50 may close upon itself over lock 13. Likewise, suitable means for securing body portion 30 to the control portion of the bicycle include slot 68 extending through body portion 30 positioned proximate surface 32. Suitable means for lashing the bicycle against surface 36 include fibrous strap 60 having female portion 62, male portion 64 and buckle 66. Strap 60 is positioned within slot 68 transverse to the axis of surface 36 so that strap 60 may close upon itself over handlebar 18 or gooseneck 20. Those skilled in the art will recognize that slots 58 and 68 are positioned such that straps 50 and 60 interlock. This serves to greatly increase the holding strength of the holder apparatus.

It will be apparent to those skilled in the art that various modifications and variations can be made in the holder for releasably securing a lock described herein. The present invention covers such modifications and variations are within the scope of the appended claims and their equivalents.

I claim:

1. A method for releasably securing a lock comprised of a U-shaped shackle having an open end and a cross-bar connected across the open end thereof to a bicycle at the steering control portion thereof characterized by the intersection of a first frame member and a crossing second frame member, the method comprising the steps of:

releasably securing a first mounting block to the first frame member, said first mounting block having a first concave mounting surface of a predetermined first axial length in which a portion of the cross-bar is cradled and an opposing second concave mounting surface of a predetermined second axial length located below said first concave mounting surface in which a portion of the first frame member is cradled;

releasably securing second and a third mounting block to the second mounting block crossing frame member, on opposite sides of said intersection said second and third mounting blocks each having a first concave mounting surface of a predetermined first axial length in which a portion of the shackle is cradled and an opposing second concave mounting surface of a predetermined second axial length located below said first concave mounting surface of each of said second and third mounting blocks, respectively, in which a portion of the second frame member is cradled;

said first and second concave mounting surfaces of said first, second and third mounting blocks each being positioned relative to each other so that the direction of said first axial length is transverse to said second axial length for each of said first, second and third mounting blocks, respectively;

releasably securing the cross-bar to said first mounting block; and releasably securing the shackle to said second and third mounting blocks.

2. A method according to claim 1, each of said first, second and third mounting blocks further having a first means proximate said second concave mounting surface for securing the lock in said first concave mounting surface and a second means proximate said first concave mounting surface for securing the steering control portion of the bicycle in said second concave mounting surface.

* * * * *